United States Patent
Hirunuma et al.

(10) Patent No.: US 6,760,163 B2
(45) Date of Patent: Jul. 6, 2004

(54) OPTICAL-POSITION ADJUSTING DEVICE FOR OPTICAL UNIT

(75) Inventors: Ken Hirunuma, Tokyo (JP); Gouji Funatsu, Saitama (JP)

(73) Assignee: PENTAX Corporation, Tokyo (JP)

( * ) Notice: Subject to any disclaimer, the term of this patent is extended or adjusted under 35 U.S.C. 154(b) by 39 days.

(21) Appl. No.: 10/434,085

(22) Filed: May 9, 2003

(65) Prior Publication Data

US 2003/0210474 A1 Nov. 13, 2003

(30) Foreign Application Priority Data

May 10, 2002 (JP) .................................... P2002-134948

(51) Int. Cl.$^7$ .......................... G02B 15/14; G02B 27/10
(52) U.S. Cl. ........................ 359/694; 359/826; 359/822
(58) Field of Search .............................. 359/694, 696.6, 359/98, 699, 826, 823, 822, 407

(56) References Cited

U.S. PATENT DOCUMENTS

| 4,067,027 A | | 1/1978 | Yamazaki .................... 396/432 |
| 4,764,783 A | | 8/1988 | Tanaka ........................ 396/144 |
| 5,523,892 A | * | 6/1996 | Yoshibe et al. ............. 359/694 |
| 5,933,285 A | * | 8/1999 | Sato et al. ................... 359/694 |
| 6,014,253 A | | 1/2000 | Funatsu ....................... 359/418 |
| 6,088,053 A | | 7/2000 | Hammack et al. ............ 348/61 |
| 2001/0028498 A1 | | 10/2001 | Haga et al. .................. 359/407 |
| 2001/0028512 A1 | * | 10/2001 | Noguchi ..................... 359/694 |

FOREIGN PATENT DOCUMENTS

| JP | 57-63502 | 4/1982 |
| JP | 6-2330 | 1/1994 |
| JP | 2001-281555 | 10/2001 |
| WO | 01/52531 | 7/2001 |

OTHER PUBLICATIONS

English Language Abstract of JP 57–63502.

* cited by examiner

Primary Examiner—Georgia Epps
Assistant Examiner—M. Hasan
(74) Attorney, Agent, or Firm—Greenblum & Bernstein, P.L.C.

(57) ABSTRACT

An optical-position adjusting device for an optical unit comprises a movement-conversion mechanism that converts a rotational movement of a rotary wheel cylinder into a linear movement of a lens barrel, and an optical-position adjusting mechanism that positions the lens barrel with respect to the rotary wheel cylinder. The optical-position adjusting mechanism has a ring and a fixing member. The ring is fit on the lens barrel in such a manner that the lens barrel can be moved along the central axis thereof. The ring is non-rotatable relative to the lens barrel. The fixing member is provided for fixing the ring to a frame in such a manner that the ring can be released from the frame.

5 Claims, 10 Drawing Sheets

OPTICAL-POSITION ADJUSTING DEVICE FOR OPTICAL UNIT

BACKGROUND OF THE INVENTION

1. Field of the Invention

The present invention relates to an optical-position adjusting device for an optical unit, by which a position of a lens barrel relative to a cylindrical member, in which the lens barrel is housed, is adjusted.

2. Description of the Related Art

Conventionally, there is known an optical device provided with an optical unit in which a lens barrel is moved along the central axis thereof by rotating a cylindrical member, so that a focusing operation of the optical system provided in the lens barrel is performed. Namely, due to a movement-conversion mechanism assembled between the cylindrical member and the lens barrel, a rotation of the cylindrical member is converted to a linear movement of the lens barrel along the central axis of the cylindrical member. The linear movement is the focusing movement of the optical system provided in the lens barrel. For performing the focusing movement properly, it is necessary to position the lens barrel relative to the cylindrical member at a predetermined correct position.

Accordingly, parts forming the optical unit are manufactured with a predetermined accuracy, and after assembling the optical unit, the lens barrel is positioned relative to the cylindrical member at a predetermined correct position. Actually, however, each of the parts of the optical unit has a manufacturing error, and an assembling error may occur in the optical unit. Thus, an optical-position adjusting device is assembled in the optical unit so that the lens barrel is positioned relative to the cylindrical member after the assembling process.

Generally, it is desirable for the portable optical device to be compact or reduced in size, and thus, an optical unit mounted in the portable optical device is required to be as compact as possible. Further, the optical unit has to be adjusted in accordance with a positional offset occurring because of change in operating conditions.

SUMMARY OF THE INVENTION

Therefore, an object of the present invention is to provide an optical-position adjusting device, which is miniaturized as much as possible, and by which an optical-position adjustment is easily performed.

According to the present invention, there is provided an optical-position adjusting device for an optical unit, comprising a cylindrical member, a support member, a lens barrel, a movement-conversion mechanism, a ring, and a fixing member.

The cylindrical member is rotatable about the axis thereof. The support member rotatably supports the cylindrical member. The lens barrel is disposed in the cylindrical member and linearly movable along the central axis of the cylindrical member. The movement-conversion mechanism converts a rotational movement of the cylindrical member into a linear movement of the lens barrel. The ring is fit on the lens barrel in such a manner that the lens barrel can be moved along the central axis thereof. The ring is non-rotatable relative to the lens barrel. The fixing member is provided for fixing the ring to the support member in such a manner that the ring can be released from the support member.

Due to this construction, when the fixing member is released from the support member, the ring becomes rotatable. The ring is then rotated, so that the lens barrel is rotated and linearly moved along the central axis of the cylindrical member due to the movement-conversion mechanism. Thus, when the ring is fixed to the support member through the fixing member after the lens barrel is positioned exactly at a predetermined position relative to the cylindrical member, the positioning process of the lens barrel to the cylindrical member is completed.

The ring may comprise teeth formed on at least a part of an outer periphery of the ring, and a key element that is slidably engaged with a key groove formed on an outer surface of the lens barrel and extended in the longitudinal direction thereof. In this case, the fixing member has a gear that is meshed with the teeth of the ring and is fixed on the support member through a screw, and the ring is rotatable when the screw is loosened, and is fixed relative to the support member when the screw is tightened.

Preferably, the lens barrel has an end portion projecting from the cylindrical member, and the ring is fit on the end portion.

The support member may be formed with a relief groove extending along the central axis of the lens barrel, to avoid an interference between said fixing member and the support member.

Further, according to the present invention, there is provided a binocular telescope with a photographing function, comprising an inner frame, a pair of telescopic optical systems, a rotary wheel, a focusing mechanism, a cylindrical member, a support member, a lens barrel, a movement-conversion mechanism, a ring, and a fixing member.

The pair of telescopic optical systems has a stationary part fixed on the inner frame, and a movable part movable relative to the stationary part, so that the telescopic optical systems focus on a subject. The rotary wheel is provided for focusing the pair of telescopic optical systems. The focusing mechanism converts a rotational movement of the rotary wheel into a relative movement of the movable part relative to the stationary part. The cylindrical member is rotatable about the axis thereof. The support member is a part of the inner frame to rotatably support the cylindrical member. The lens barrel is disposed in the cylindrical member and linearly movable along the central axis of the cylindrical member, and houses a photographing optical system. The movement-conversion mechanism converts a rotational movement of the cylindrical member into a linear movement of the lens barrel to focus the photographing optical system. The ring is fit on the lens barrel in such a manner that the lens barrel can be moved along the central axis thereof. The ring is non-rotatable relative to the lens barrel. The fixing member is provided for fixing the ring to the support member in such a manner that the ring can be released from the support member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to the embodiments shown in the drawings.

Figure 1:
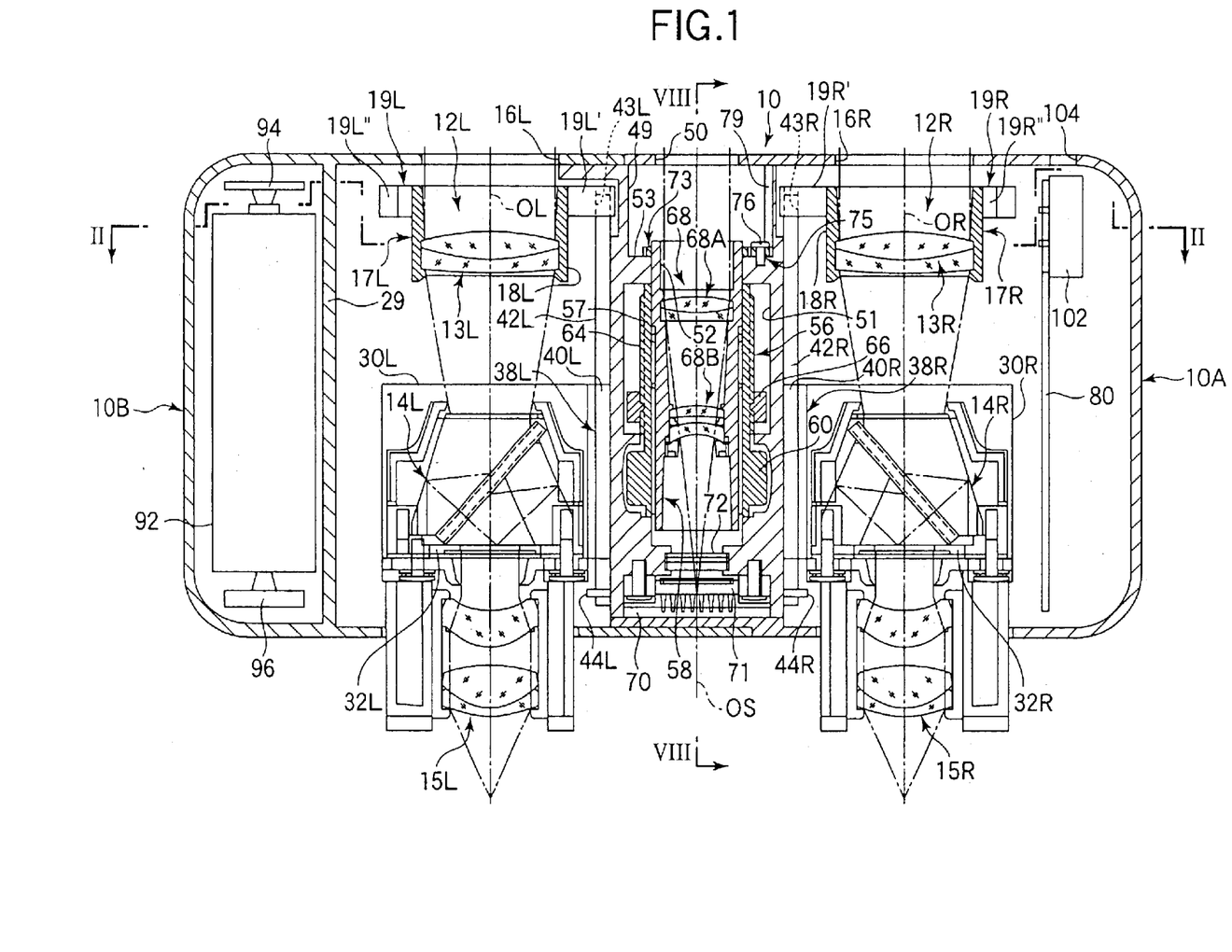
FIG. 1 is a horizontal sectional view showing an embodiment according to the present invention of an optical-position adjusting device for an optical unit, which is assembled in a binocular telescope with a photographing function, in a state in which a movable casing section is set at a retracted position.
Figure 2:
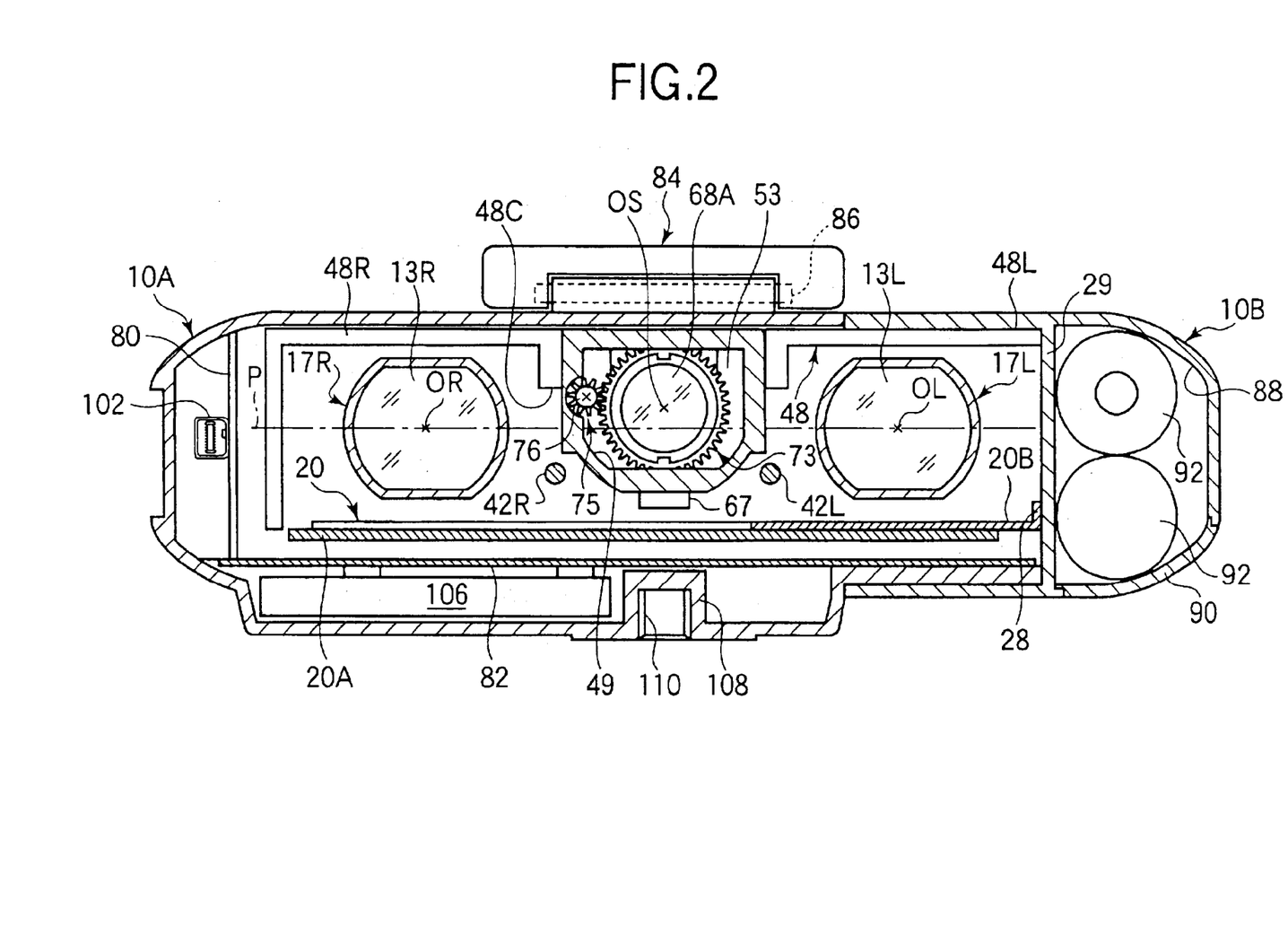
FIG. 2 is a sectional view along line II—II of FIG. 1.

FIG. 1 shows an internal structure of a binocular-telescope with a photographing function, in which an optical-position adjusting device of an embodiment of the present invention is mounted, the portable apparatus being a binocular telescope with a photographing function. FIG. 2 is a sectional view along line II—II of FIG. 1, and in FIG. 2, some elements are omitted so as to simplify the drawing. In the embodiment, the binocular telescope has a casing 10 having an approximately box-like shape, which comprises a main casing section 10A and a movable casing section 10B.

A pair of telescopic optical systems 12R and 12L are provided in the casing 10. The telescopic optical systems 12R and 12L have a symmetrical structure, and are used for a right telescopic optical system and a left telescopic optical system. The right telescopic optical system 12R is mounted in the main casing section 10A, and contains an objective lens system 13R, an erecting prism system 14R, and an ocular lens system 15R. An observation window 16R is formed in a front wall of the main casing section 10A, and is aligned with the objective lens system 13R. The left telescopic optical system 12L is mounted in the movable casing section 10B, and contains an objective lens system 13L, an erecting prism system 14L, and an ocular lens system 15L. An observation window 16L is formed in a front wall of the movable casing section 10B, and is aligned with the objective lens system 13L.

Note that for simplicity of explanation, in the following description, front and back are respectively defined as a side of the objective lens system and a side of the ocular lens system, relative to the pair of telescopic optical systems 12R and 12L, and right and left are respectively defined as the right side and the left side when facing the ocular lens systems 15R and 15L.

The movable casing section 10B is slidably engaged with the main casing section 10A such that the movable casing section 10B can be moved relative to the main casing section 10A. Namely, the movable casing section 10B is movable between a retracted position shown in FIGS. 1 and 2, and a maximum-extended position in which the movable casing section 10B is pulled out from the retracted position, shown in FIGS. 3 and 4. A suitable friction force acts on the sliding surfaces of both the casing sections 10A and 10B, and thus a certain extension or contraction force must be exerted on the movable casing section 10B before the movable casing section 10B can be extended from or contracted onto the main casing section 10A. Thus, it is possible for the movable casing section 10B to hold or stay still at an optical position between the fully retracted position (FIGS. 1 and 2) and the maximum-extended position (FIGS. 3 and 4), due to the suitable friction force acting on the sliding surface of both the casing sections 10A and 10B.

Figure 3:
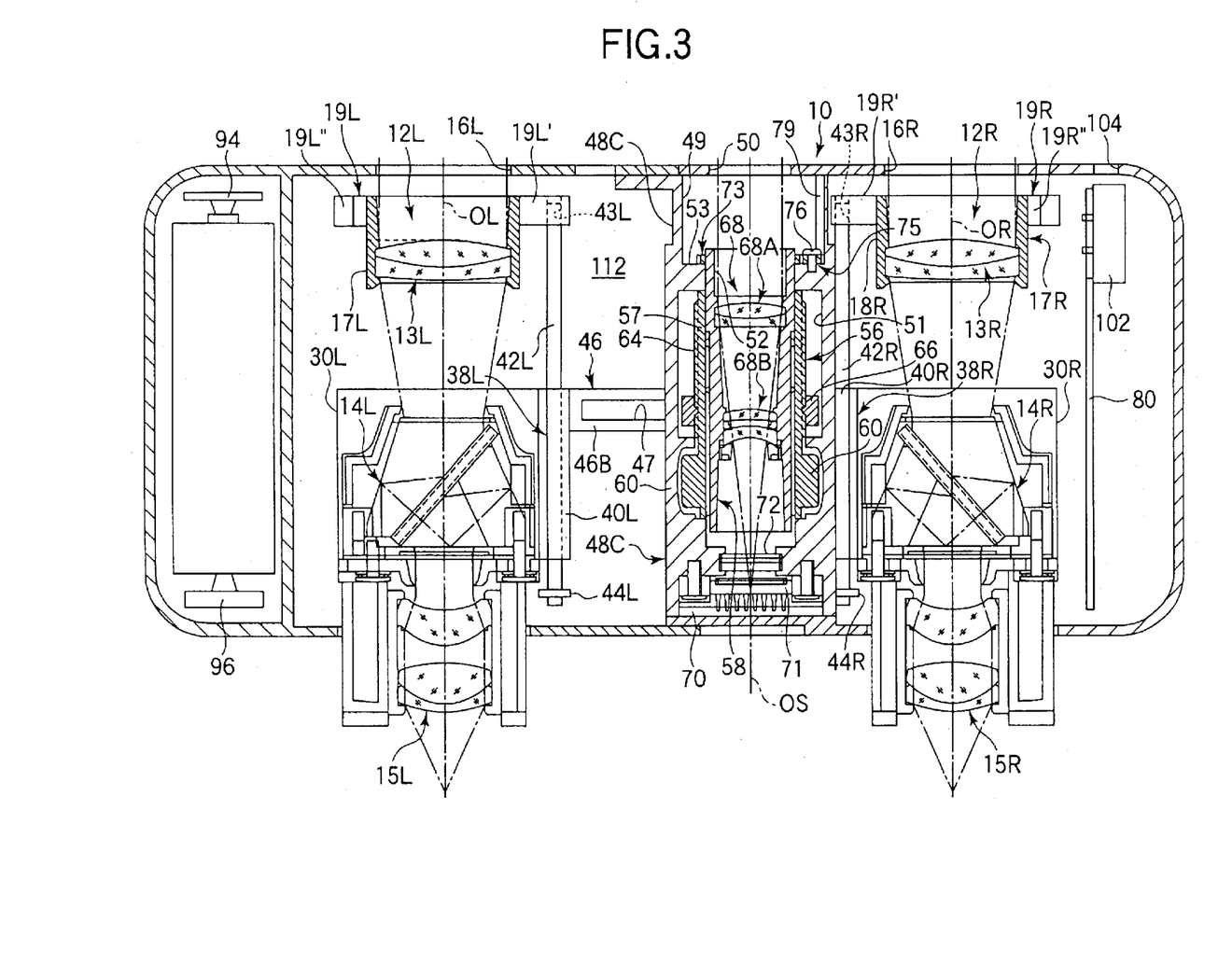
FIG. 3 is a horizontal sectional view similar to FIG. 1, the movable casing section being set at a maximum-extended position.
Figure 4:
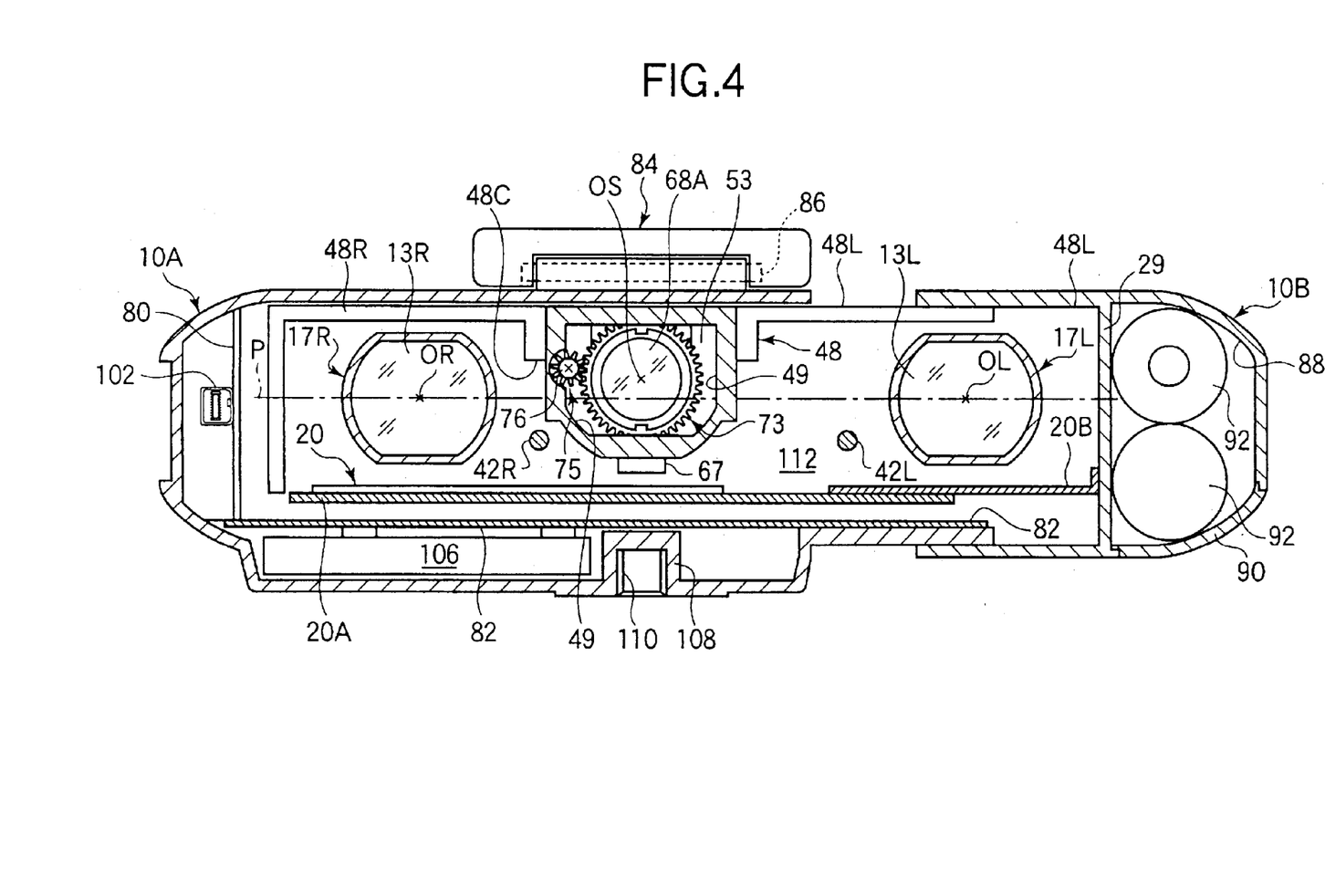
FIG. 4 is a horizontal sectional view similar to FIG. 2, the movable casing section being set at a maximum-extended position.

As understood from the comparison between FIGS. 1 and 2 and FIGS. 3 and 4, when the movable casing section 10B is pulled out from the main casing section 10A, the left telescopic optical system 12L is moved together with the movable casing section 10B, while the right telescopic optical system 12R is held in the main casing section 10A. Thus, by positioning the movable casing section 10B at an arbitrary extended position relative to the main casing section 10A, the distance between the optical axes of the ocular lens systems 15R and 15L, i.e., the interpupillary distance is adjusted. When the movable casing section 10B is set at the retracted position relative to the main casing section 10A, the distance between the telescopic optical systems 12R and 12L becomes the minimum (FIGS. 1 and 2), and when the movable casing section 10B is set at the maximum-extended position relative to the main casing section 10A, the distance between the telescopic optical systems 12R and 12L becomes the maximum (FIGS. 3 and 4).

The objective lens system 13R of the right telescopic optical system 12R is housed in a lens barrel 17R, which is mounted at a fixed position relative to the main casing section 10A, and the erecting prism system 14R and the ocular lens system 15R can be moved back and forth with respect to the objective lens system 13R, so that the right telescopic optical system 12R can be focused. Similarly, the objective lens system 13L of the left telescopic optical system 12L is housed in a lens barrel 17L, which is mounted at a fixed position relative to the movable casing section 10B, and the erecting prism system 14L and the ocular lens system 15L can be moved back and forth with respect to the objective lens system 13L, so that the left telescopic optical system 12L can be focused.

The lens barrel 17R has a cylindrical portion 18R, in which the objective lens system 13R is housed, and an attaching base 19R integrally formed under the cylindrical portion 18R. The attaching base 19R has an inside attaching portion 19R' extending toward the center of the casing 10 from the cylindrical portion 18R, and an outside attaching portion 19R" extending toward the outside of the casing 10 from the cylindrical portion 18R. The inside attaching portion 19R' is a side block portion having a relatively large thickness, and the outside attaching portion 19R" is a flat portion.

Similarly, the lens barrel 17L has a cylindrical portion 18L, in which the objective lens system 13L is housed, and an attaching base 19L integrally formed under the cylindrical portion 18L. The attaching base 19L has an inside attaching portion 19L' extending toward the center of the casing 10 from the cylindrical portion 18L, and an outside attaching portion 19L" extending toward the outside of the casing 10 from the cylindrical portion 18L. The inside attaching portion 19L' is a side block portion having a relatively large thickness, and the outside attaching portion 19L" is a flat portion.

Figure 5:
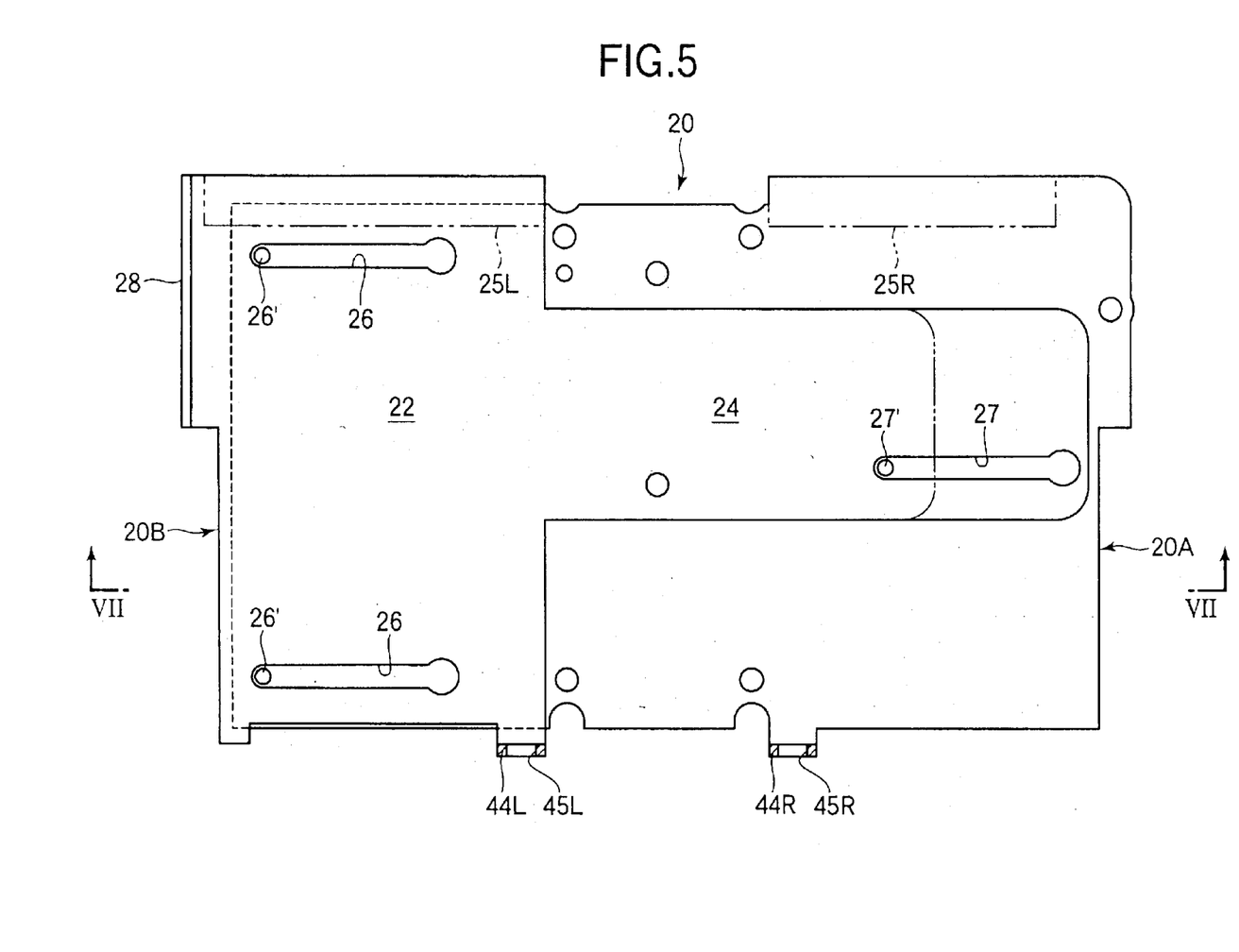
FIG. 5 is a plan view showing an optical system mount plate provided in a casing of the binocular telescope shown in FIG. 1.

To perform the interpupillary distance adjusting operation and the focusing operation described above, an optical system mount plate 20 shown in FIG. 5 is provided on a bottom side of the casing 10. Note that, in FIGS. 1 and 3, the optical system mount plate 20 is omitted for the simplicity of the drawings.

The optical system mount plate 20 is composed of a rectangular plate 20A, fixed to the main casing section 10A, and a slide plate 20B slidably disposed on the rectangular plate 20A and fixed to the movable casing section 10B. The rectangular plate 20A and the slide plate 20B are made of appropriate metal material, preferably, light metal, such as aluminum or aluminum alloy.

The slide plate 20B has a rectangular portion 22, having approximately the same breadth as the rectangular plate 20A, and an extending portion 24, integrally connected to and extending rightward from the rectangular portion 22. The attaching base 19R of the lens barrel 17R is fixed at a predetermined position on the rectangular plate 20A, and the attaching base 19L of the lens barrel 17L is fixed at a predetermined position on the rectangular portion 22 of the rectangular plate 20B. Note that, in FIG. 5, the fixed position of the attaching base 19R of the lens barrel 17R is indicated as an area enclosed by chain double-dashed line 25R, and the fixed position of the attaching base 19L of the lens barrel 17L is indicated as an area enclosed by chain double-dashed line 25L.

A pair of guide slots 26 are formed in the rectangular portion 22 of the slide plate 20B, and another guide slot 27 is formed in the extending portion 24. A pair of guide pins 26', slidably engaged with the guide slots 26, and guide pin 27', slidably engaged with the guide slot 27, are fixed on the rectangular plate 20A. The guide slots 26 and 27 are parallel to each other, and extend in the right and left direction by the same length. The length of each of the guide slots 26 and 27 corresponds to a movable distance of the movable casing section 10B relative to the main casing section 10A, i.e., the distance between the retracted position of the movable casing section 10B (FIGS. 1 and 2) and the maximum-extended position of the movable casing section 10B (FIGS. 3 and 4).

As understood from FIGS. 2 and 4, the optical system mount plate 20 is placed in the casing 10, and separated from the bottom of the casing 10 to form a space therein. The rectangular plate 20A is fixed to the main casing section 10A, and the slide plate 20B is fixed to the movable casing section 10B. Note that, for fixing the slide plate 20B to the movable casing section 10B, a flange 28, extending along the left side edge of the rectangular portion 22, is provided, and fixed on a partition 29 formed in the movable casing section 10B.

Figure 6:
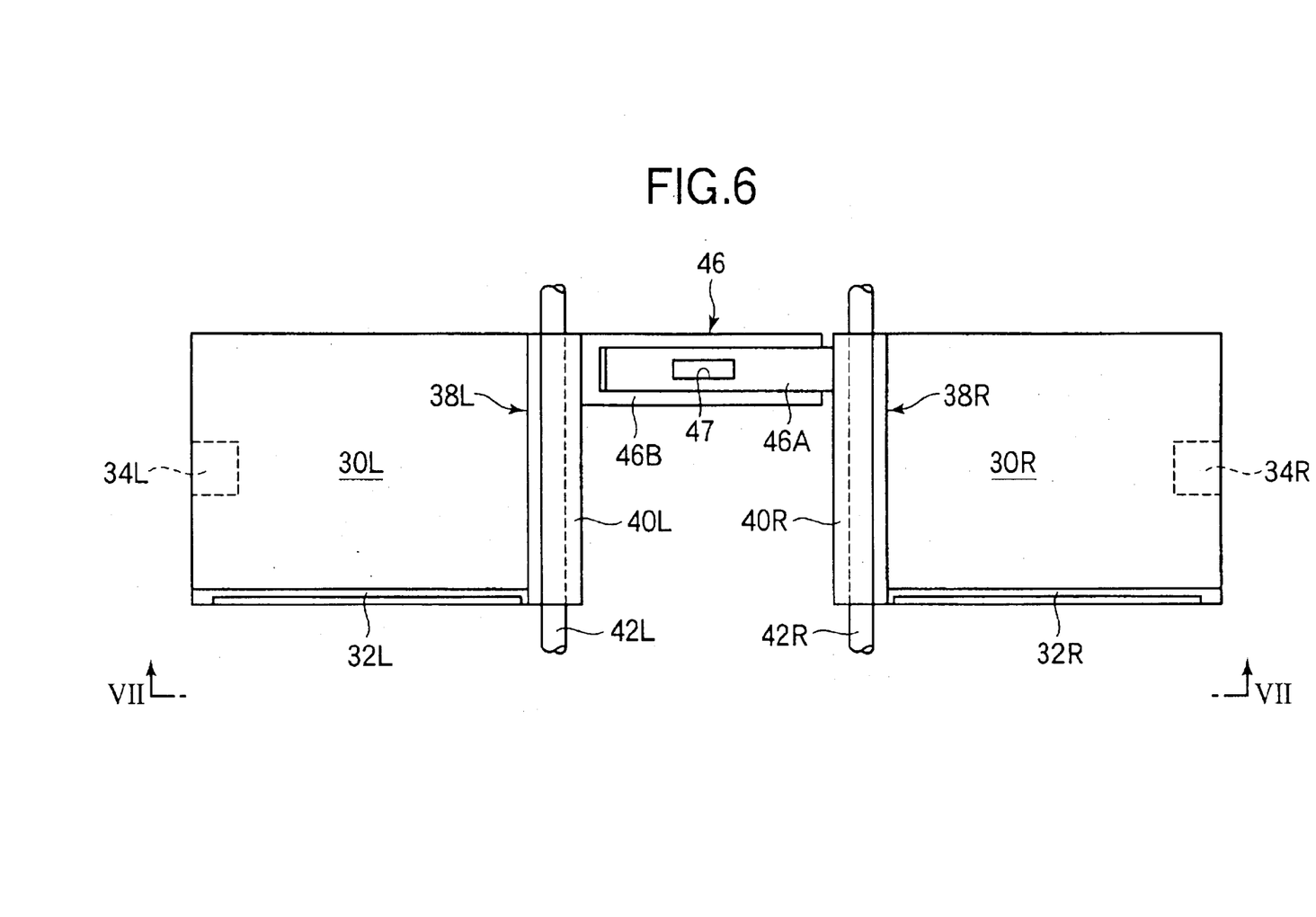
FIG. 6 is a plan view showing right and left mount plates which are disposed on the optical system mount plate shown in FIG. 5.
Figure 7:
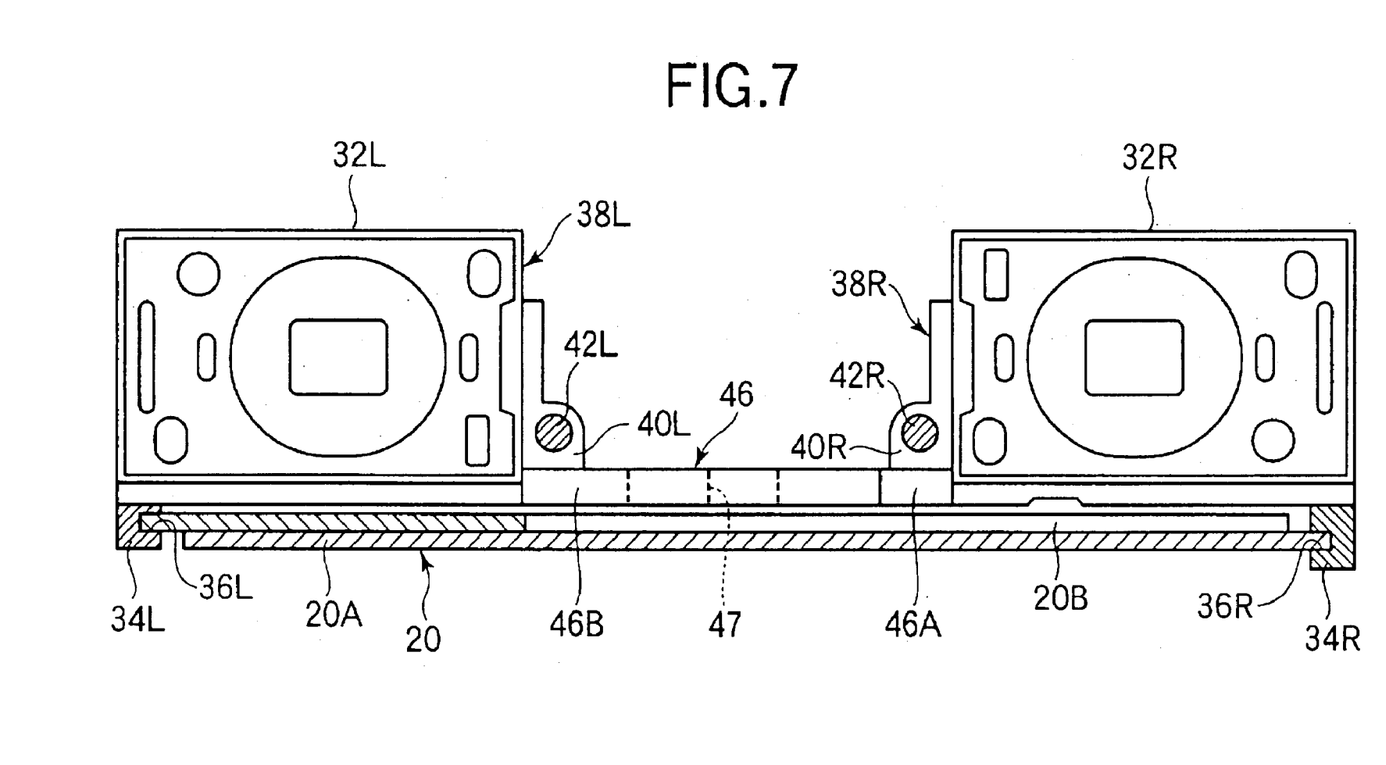
FIG. 7 is an elevational view observed along line VII—VII of FIG. 6, in which the optical system mount plate is indicated as a sectional view along line VII—VII of FIG. 5.

FIGS. 6 and 7 show a right mount plate 30R and a left mount plate 30L. The right mount plate 30R is provided for mounting the erecting prism system 14R of the right telescopic optical system 12R, and the left mount plate 30L is provided for mounting the erecting prism system 14L of the left telescopic optical system 12L. Upright plates 32R and 32L are provided along the rear peripheries of the right and left mount plates 30R and 30L. As shown in FIGS. 1 and 3, the right ocular lens system 15R is attached to the upright plate 32R, and the left ocular lens system 15L is attached to the upright plate 32L.

As shown in FIGS. 6 and 7, the right mount plate 30R is provided with a guide shoe 34R secured to the underside thereof in the vicinity of the right side edge thereof. The guide shoe 34R is formed with a groove 36R, which slidably receives a right side edge of the rectangular plate 20A, as shown in FIG. 7. Similarly, the left mount plate 30L is provided with a guide shoe 34L secured to the underside thereof in the vicinity of the left side edge thereof. The guide shoe 34L is formed with a groove 36L, which slidably receives a right side edge of the rectangular plate 20B, as shown in FIG. 7.

Note that since FIG. 7 is a sectional view along line VII—VII of FIG. 6, the optical system mount plate 20 should not be indicated in FIG. 7. Nevertheless, for simplicity of explanation, in FIG. 7, the optical system mount plate 20 is indicated as a section along line VII—VII of FIG. 5, and the guide shoes 34R and 34L are indicated as sectional views.

As shown in FIGS. 6 and 7, the right mount plate 30R has a side wall 38R provided along a left side edge thereof, and a lower portion of the side wall 38R is formed as a swollen portion 40R having a through bore for slidably receiving a guide rod 42R. The front end of the guide rod 42R is inserted in a hole 43R formed in the inside attaching portion 19R' of the attaching base 19R, and is fixed thereto. The rear end of the guide rod 42R is inserted in a hole 45R formed in an upright fragment 44R integrally formed on a rear edge of the rectangular plate 20A, and is fixed thereto (see FIG. 5). Note that, in FIG. 5, the upright fragment 44R is indicated as a sectional view so that the hole 45R is observed, and in FIGS. 1 and 3, the rear end of the guide rod 42R is inserted in the hole 45R of the upright fragment 44R.

Similarly, the left mount plate 30L has a side wall 38L provided along a right side edge thereof, and a lower portion of the side wall 38L is formed as a swollen portion 40L having a through bore for slidably receiving a guide rod 42L. The front end of the guide rod 42L is inserted in a hole 43L formed in the inside attaching portion 19L' of the attaching base 19L, and is fixed thereto. The rear end of the guide rod 42L is inserted in a hole 45L formed in an upright fragment 44L integrally formed on a rear edge of the rectangular plate 20B, and is fixed thereto. Note that, similarly to the upright fragment 44R, in FIG. 5, the upright fragment 44L is indicated as a sectional view so that the hole 45L is observed, and in FIGS. 1 and 3, the rear end of the guide rod 42L is inserted in the hole 45L of the upright fragment 44L.

The objective lens system 13R of the right telescopic optical system 12R is disposed at a stationary position in front of the right mount plate 30R. Therefore, when the right mount plate 30R is moved back and forth along the guide rod 42R, the distance between the objective lens system 13R and the erecting prism system 14R is adjusted, so that a focusing operation of the right telescopic optical system 12R is performed. Similarly, since the objective lens system 13L of the left telescopic optical system 12L is disposed at a stationary position in front of the left mount plate 30L, by moving the left mount plate 30L back and forth along the guide rod 42L, the distance between the objective lens system 13L and the erecting prism system 14L is adjusted, so that a focusing operation of the left telescopic optical system 12L is performed.

In order to simultaneously move the right and left mount plates 30R and 30L along the guide rods 42R and 42L such that a distance between the right and left mount plates 30R and 30L is variable, the mount plates 30R and 30L are interconnected to each other by an expandable coupler 46, as shown in FIGS. 6 and 7.

In particular, the expandable coupler 46 includes a rectangular lumber-like member 46A, and a forked member 46B in which the lumber-like member 46A is slidably received.

The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both members 46A and 46B have a length which is greater than the distance of movement of the movable casing section 10B, between its retracted position (FIGS. 1 and 2) and its maximum extended position (FIGS. 3 and 4). Namely, even though the movable casing section 10B is extended from the retracted position to the maximum extended position, slidable engagement is maintained between the members 46A and 46B.

Figure 8:
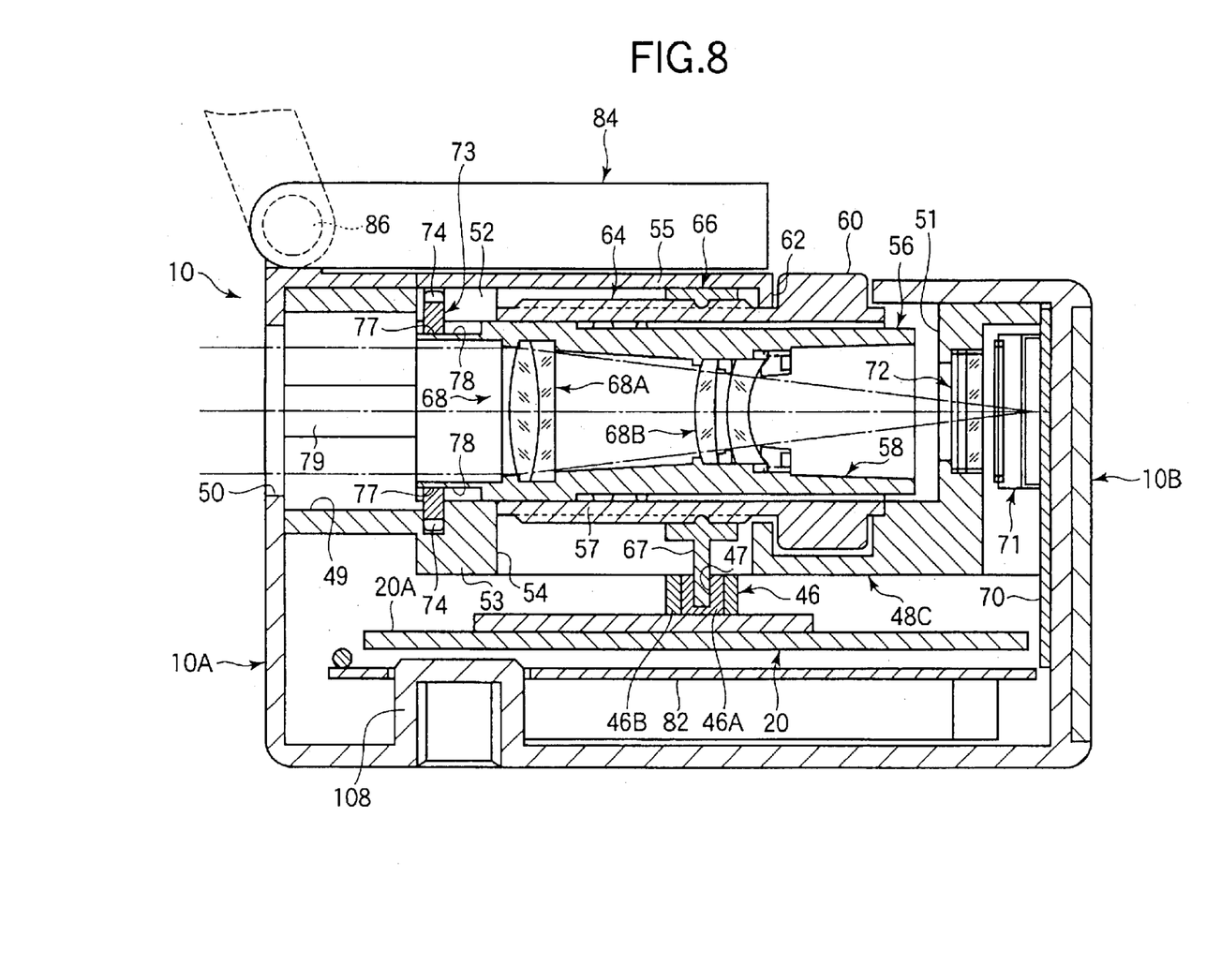
FIG. 8 is an elevational view observed along line VIII—VIII of FIG. 1.

With reference to FIG. 8, there is shown a vertical sectional view along line VIII—VIII of FIG. 1. As understood from FIGS. 2, 4, and 8, an inner frame 48 is housed in the casing 10, and is fixed to the main casing section 10A and the rectangular plate 20A. The inner frame 48 has a central portion 48C, a right wing portion 48R extending from the central portion 48C rightward, a vertical wall 48S extending from a right periphery of the right wing portion 48R downward, and a left wing portion 48L extending from the central portion 48C leftward.

As shown in FIGS. 2, 4, and 8, a bore 49, having an approximately rectangular section, is formed in a front end portion of the central portion 48C, and is aligned with a circular window 50 formed in a front wall of the main casing section 10A. A recess 51, having an approximately U-shaped section, is formed in a rear side of the bore 49 in the central portion 48C, and a boundary wall 53 is formed between the bore 49 and the recess 51. A rectangular opening 54 is formed in a bottom of the recess 51, and extends along the longitudinal direction of the recess 51. A top wall of the main casing section 10A is provided with an opening for exposing the recess 51, and the opening is closed by a cover plate 55 which can be removed from the opening.

A photographing optical unit 56 is assembled in the recess 51 while the cover plate 55 is removed. The optical unit 56 has a rotary wheel cylinder (i.e., cylindrical member) 57 and a lens barrel 58 disposed coaxially in the rotary wheel cylinder 57. The rotary wheel cylinder 57 is rotatably supported in the recess 51, and the lens barrel 58 can be moved along the central axis thereof while the lens barrel 58 is kept still so as not to rotate about the central axis. After assembling the photographing optical unit 56, the cover plate 55 is fixed to cover the recess 51, and the main casing section 10A is then attached to the inner frame 48. A rotary wheel 60 is provided on the rotary wheel cylinder 57. The rotary wheel 60 has an annular projection formed on an outer surface of the rotary wheel cylinder 57, and the rotary wheel 60 exposes outside the top wall of the main casing section 10A through an opening 62 formed in the cover plate 55.

Helicoids 64 are formed on an outer surface of the rotary wheel cylinder 57, and an annular member 66 is threadingly fit on the helicoids 64. Namely, a plurality of projections, engaged with the helicoids 64 of the rotary wheel cylinder 57, are formed on an inner wall of the annular member 66, and disposed at a constant interval. A flat surface is formed on an outer periphery of the annular member 66, and is slidably engaged with an inner wall of the cover plate 55. Namely, when the rotary wheel cylinder 57 is rotated, the annular member 66 is not rotated due to the engagement of the flat surface and the inner wall of the cover plate 55, and is kept in a non-rotational state. Thus, when the rotary wheel cylinder 57 is rotated, the annular member 66 is moved along the central axis of the rotary wheel cylinder 57 due to the threading contact with the helicoids 64, and the moving direction depends on the rotational direction of the rotary wheel cylinder 57.

A tongue 67 is projected from the annular member 66, and is positioned at an opposite side of the flat surface of the annular member 66. As shown in FIG. 8, the tongue 67 is projected from the rectangular opening 54 of the central portion 48C, and is inserted in a hole 47 formed in the rod member 46A. Therefore, when a user rotates the rotary wheel cylinder 57 by contacting the exposed portion of the rotary wheel 60 with a finger, for example, the annular member 66 is moved along the central axis of the rotary wheel cylinder 57, as described above, so that the mount plates 30R and 30L are moved along the optical axes of the telescopic optical systems 12R and 12L. Thus, the rotational movement of the rotary wheel 60 is transformed into linear movements of the erecting prism systems 14R and 14L, and the ocular lens systems 15R and 15L, so that the telescopic optical systems 12R and 12L can be focused.

In this embodiment, the pair of telescopic optical systems 12R and 12L are designed, for example, in such a manner that, when each of the erecting prism systems 14R and 14L, and the ocular lens systems 15R and 15L is positioned closest to each of the objective lens systems 13R and 13L, the infinity-focusing position, the pair of telescopic optical systems 12R and 12L focus on an object located at a distance between 40 meters ahead of the binocular telescope and infinity, and when observing an object between 2 meters and 40 meters ahead of the binocular telescope, the erecting prism systems and the ocular lens systems are separated from the objective lens systems so as to focus on the object. Namely, when the erecting prism systems are separated from the objective lens systems by the maximum distance, the pair of telescopic optical systems focus on an object located at a distance approximately 2 meters ahead of the binocular telescope.

A photographing optical system 68 is provided in the lens barrel 58, which is coaxially disposed in the rotary wheel cylinder 57. The photographing optical system 68 has a first lens group 68A and a second lens group 68B. A circuit board 70 is attached on an inner surface of a rear end wall of the main casing section 10A. A solid-state imaging device such as a CCD 71 is mounted on the circuit board 70, and a light-receiving surface of the CCD 71 is aligned with the photographing optical system 68. An opening is formed in a rear end portion of the central portion 48C of the inner frame 48, and is aligned with the optical axis of the photographing optical system 68. An optical low-pass filter 74 is fit in the opening. Thus, the binocular telescope of this embodiment has the same photographing function as a digital camera, so that an object image obtained by the photographing optical system 68 is formed on the light-receiving surface of the CCD 71 through the optical low-pass filter 72.

In FIGS. 1 through 4, the optical axis of the photographing optical system 68 is indicated by the reference OS, and the optical axes OR and OL of the right and left telescopic optical systems 12R and 12L are indicated by references OR and OL. The optical axes OR and OL are parallel to each other, and to the optical axis OS of the photographing optical system 68. As shown in FIGS. 2 and 4, the optical axes OR and OL define a plane P which is parallel to the optical axis OS of the photographing optical system 68. The right and left telescopic optical systems 12R and 12L can be moved parallel to the plane P, so that the distance between the optical axes OR and OL, i.e., the interpupillary distance, can be adjusted.

The digital camera having the photographing optical system 68 and the CCD 71 is constructed in such a manner that the photographing optical system 68 focuses an object including a near object, which is situated 2 meters ahead of the binocular telescope, for example, similarly to a usual digital camera. Therefore, a focusing mechanism for the lens barrel 58 is assembled in the photographing optical unit 56. Namely, a female screw is formed on an inner wall of the rotary wheel cylinder 57, while a male screw is formed on an outer wall of the lens barrel 58, so that the lens barrel 58 is threadingly fit in the rotary wheel cylinder 57. The lens barrel 58 is movable along the central axis of the rotary wheel cylinder 57, while the lens barrel 58 is prevented from rotating. Therefore, when the rotary wheel cylinder 57 is rotated, the lens barrel 58 is moved forward or rearward with respect to the CCD 71 due to the threading fit of the male and female screw, so that a near object image is focused on the light-receiving surface of the CCD 71.

Figure 9:
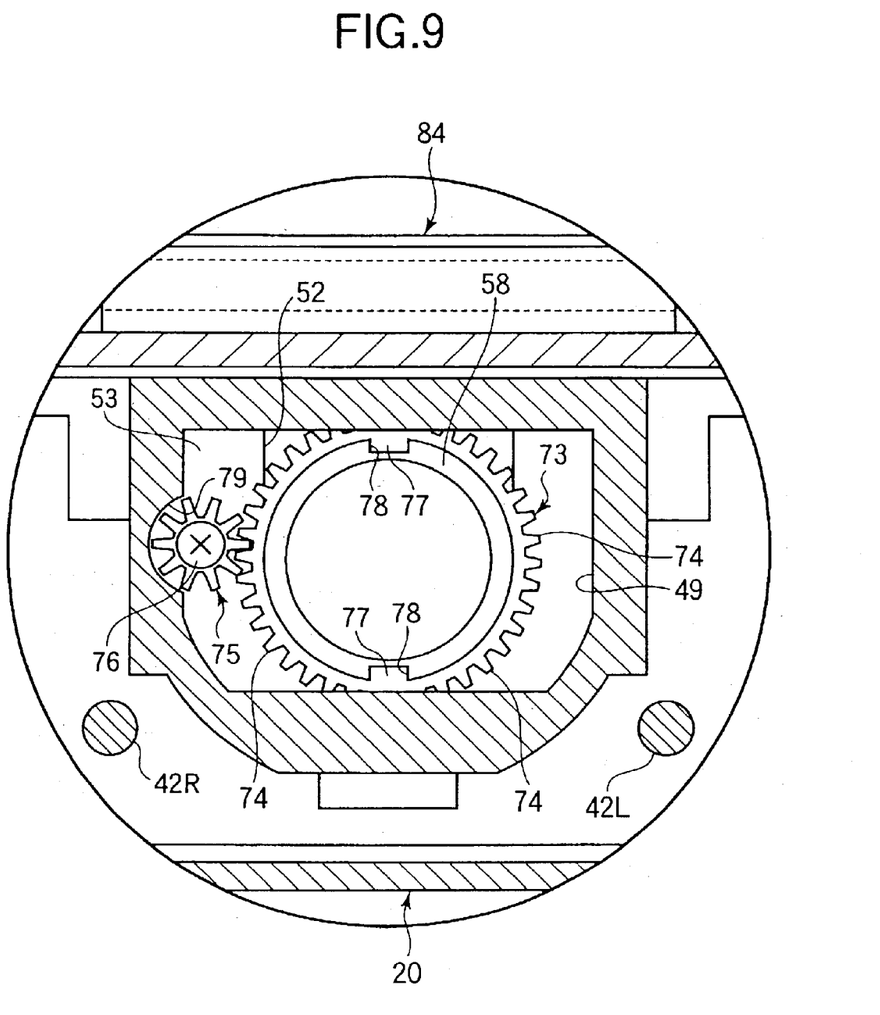
FIG. 9 is a partially enlarged view showing a main part of the binocular telescope shown in FIG. 2.
Figure 10:
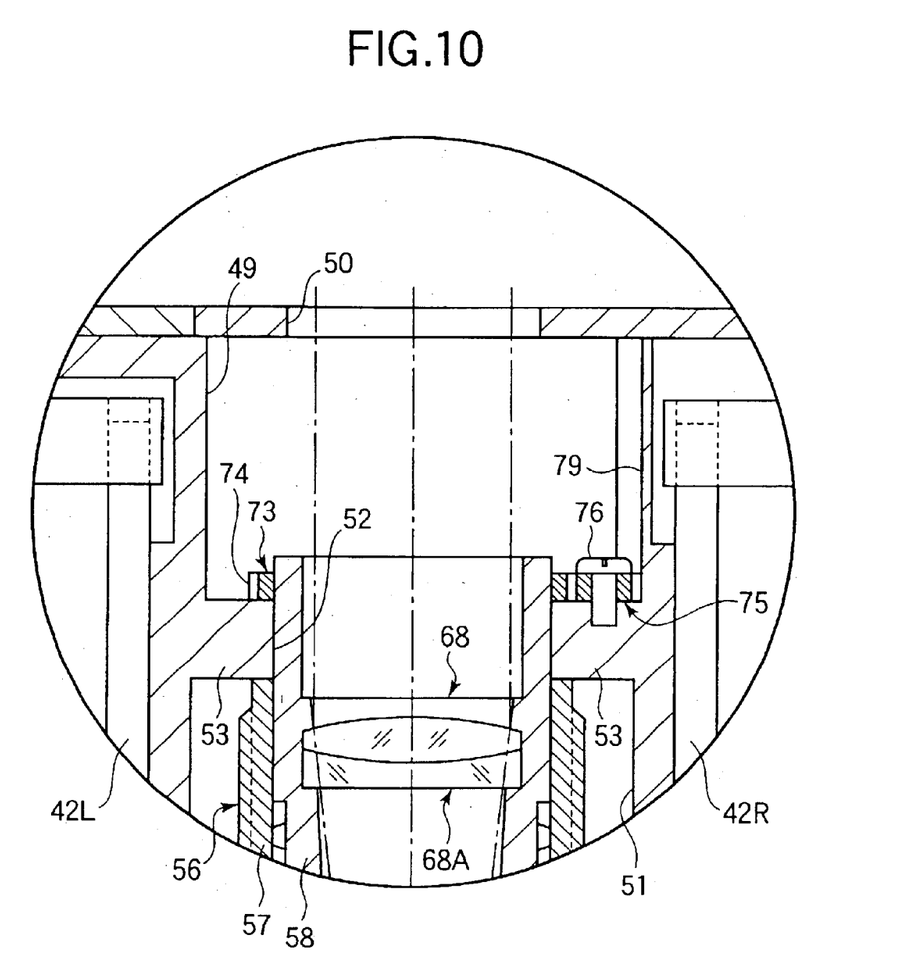
FIG. 10 is a partially enlarged view showing the main part of the binocular telescope shown in FIG. 2.

For making the lens barrel 58 movable along the central axis in the rotary wheel cylinder 57, the front end of the lens barrel 58 is slidably housed in a U-shaped opening 52 formed in the boundary wall 53, and for holding the lens barrel 58 so as to be non-rotatable in the rotary wheel cylinder 57, a ring 73 is fit on the front end of the lens barrel 58, as shown in FIGS. 9 and 10.

Teeth 74 are formed along an outer periphery of the ring 73. A small gear 75, which is fixed in a threaded hole formed on a front surface of the boundary wall 53 through a screw 76, is meshed with the teeth 74. A pair of key elements 77, positioned diametrically opposite each other, is integrally and inwardly projected from an inner surface of the ring 73. The key elements 77 are engaged with a pair of key grooves 78 formed on a front end of the lens barrel 58 and extending in the longitudinal direction thereof, so that the lens barrel 58 is guided by the engagement of the key grooves 78 and the key elements 77 to linearly move, while the rotation of the lens barrel 58 is prevented.

For an attaching process in which the small gear 75 is attached to the front surface of the boundary wall 53, a semi-circle section groove (or relief groove) 79, extending along the central axis of the lens barrel 58, is formed on an inner surface of the bore 49, to avoid an interference between the small gear 75 and the central portion 48C. The semi-circle section groove 79 extends from the front end of the central portion 48C to the front surface of the boundary wall 53. Thus, the small gear 75 is attached to the boundary wall 53 while a half of the small gear 75 is fit in the semi-circle section groove 79, and fixed to the front surface through the screw 76.

Note that the attaching process of the small gear 75 is carried out before the optical system mount plate 20 and the telescopic optical systems 12R and 12L are assembled in the inner frame 48 and then housed in the main casing 10A. Therefore, the attaching process is easily carried out. In other words, the small gear 75 is not attached by passing it through the circular window 50 which is formed in the front wall of the main casing 10A and is relatively small.

Therefore, when the rotary wheel cylinder 57 is rotated by an operation of the rotary wheel 60, the lens barrel 58 is moved along the optical axis of the photographing optical system 68. Thus, the female screw formed on the inner wall of the rotary wheel cylinder 57 and the male screw formed on the outer wall of the lens barrel 58 form a movement-conversion mechanism that converts a rotational movement of the rotary wheel cylinder 57 into a linear movement or focusing movement of the lens barrel 58, and the movement-conversion mechanism functions as a focusing mechanism for the lens barrel 58.

Helicoids 64 formed on the outer wall of the rotary wheel cylinder 57 and the female screw formed on the inner wall of the rotary wheel cylinder 57 are inclined in the opposite direction to each other so that, when the rotary wheel cylinder 57 is rotated in such a manner that the erecting prism systems 14R and 14L and the ocular lens systems 15R and 15L are separated from the objective lens systems 13R and 13L, the lens barrel 58 is moved to separate from the CCD 71. Due to this, an image of a near object can be focused on the light-receiving surface of the CCD 71. The pitch of the helicoids 64 and the pitch of the female screw of the inner wall are different from each other in accordance with the optical characteristics of the pair of telescopic optical systems 12R and 12L and the photographing optical system 68.

As described above, when the erecting prism systems 14R and 14L, and the ocular lens systems 15R and 15L are placed at the infinity-focusing position and positioned closest to the objective lens systems 13R and 13L, the telescopic optical systems 12R and 12L focus on an object located at a distance between 40 meters ahead of the binocular telescope and infinity. Accordingly, when the erecting prism systems 14R and 14L, and the ocular lens systems 15R and 15L are placed at the infinity-focusing position, the lens barrel 58 and therefore the photographing optical system 68 should be positioned exactly at the infinity-focusing position, which is a position closest to the light-receiving surface of the CCD 71.

However, since each of the components of the photographing optical unit 56 has a manufacturing error and an assembling error as described above, even if the erecting prism systems 14R and 14L and the ocular lens systems 15R and 15L are positioned at the infinity-focusing position, the photographing optical system 68 is not necessarily exactly positioned at the infinity-focusing position which is the closest position to the light-receiving surface of the CCD 71.

In the embodiment, the ring 73 and the small gear 75 not only function as a holding device for holding the lens barrel 58 in a non-rotatable state in the rotary wheel cylinder 57, but also function as an optical-position adjusting device for optically positioning the photographing optical system 68 relative to the light-receiving surface of the CCD 71. Note that the photographing optical system 68 is positioned relative to the light-receiving surface of the CCD 71 through the optical-position adjusting device in the embodiment, which is equal to positioning the lens barrel 58 relative to the rotary wheel cylinder 57.

A function of the optical-position adjusting device containing the ring 73 and the small gear 75 will be described below.

First, the pair of mount plates 30R and 30L are moved toward the pair of objective lens systems 13R and 13L, so that the erecting prism systems 14R and 14L and the ocular lens systems 15R and 15L are placed exactly at the infinity-focusing position relative to the objective lens systems 13R and 13L. The photographing optical unit 56 is then housed in the recess 51 of the central portion 48C, and the front end portion of the lens barrel 58 of the photographing optical unit 56 is projected from the rotary wheel cylinder 57, so that the ring 73 is fit on the front end portion. After that, the small gear 75 is meshed with the teeth 74 of the ring 73, and is fixed to the front surface of the boundary wall 53 through the screw 76. Thus, this stage of the assembling process of the photographing optical unit 56 halts. Note that, since the lens barrel 58 is positioned at the infinity-focusing position relative to the rotary wheel cylinder 57 during the assembling process, the tongue 67 of the annular member 66 can be inserted in the hole 47 of the rod member 46A of the expandable coupler 46 which connects the pair of mount plates 30R and 30L to each other.

After the photographing-optical unit 56 is assembled, a distance from the lens barrel 58 to the light-receiving surface of the CCD 71 is measured, so that it can be checked whether the photographing optical system 68 provided in the lens barrel 58 is positioned exactly at the infinity-focusing position relative to the light-receiving surface of the CCD 71. If the photographing optical system 68 provided in the lens barrel 58 is positioned exactly at the infinity-focusing position relative, a position adjustment of the lens barrel 58 is not needed.

Conversely, if the photographing optical system 68 provided in the lens barrel 58 is offset from the infinity-focusing position, the screw 76 is loosened, and the ring 73 is then rotated while the rotary wheel cylinder 57 is prevented from rotating, so that the lens barrel 58 is also rotated together with the ring 73. Thus, the lens barrel 58 is moved relative to the rotary wheel cylinder 57 along the central axis thereof, depending upon the rotational direction. Namely, the position of the photographing optical system 68 along the optical axis with respect to the light-receiving surface of the CCD 71 is finely adjusted, so that the photographing optical system 68 can be exactly positioned at the infinity-focusing position relative to the light-receiving surface of the CCD 71. After such a fine adjustment, the screw 76 is again tightened, so that the ring 73 is fixed on the boundary wall 53, and thus, the assembling process of the photographing optical unit 56 is completed.

Thus, the small gear 75 functions as a fixing member for fixing the ring 73 to the inner frame 48 in such a manner that the ring 73 can be released from the inner frame 48. Taking advantage of this function, a mechanism containing the ring 73 and the small gear 75, by which the lens barrel 58 is movable along the central axis in the rotary wheel cylinder 57 and prevented from rotating in the rotary wheel cylinder 57, can be used as an optical-position adjusting device for positioning the photographing optical system 68 with regard to the light-receiving surface of the CCD 71. That is, usually, by setting the ring 73 so as to prevent it from rotating, the ring 73 has a linearly guiding function and prevents rotation of the lens barrel 58. For position adjustment of the photographing optical system 68 relative to the light-receiving surface of the CCD 71, the ring 73 is set to be rotatable, so that the position adjustment of the photographing optical system 68 is performed. Thus, according to the embodiment, other than this mechanism (i.e., the ring 73 and the small gear 75), in which the lens barrel 58 is movable along the central axis in the rotary wheel cylinder 57 and prevented from rotating in the rotary wheel cylinder 57, it is not necessary to provide an optical-position adjusting device for positioning the photographing optical system 68 with regard to the light-receiving surface of the CCD 71.

The rotary wheel cylinder 57 should not be allowed to rotate during the fine adjustment of the position of the photographing optical system 68. This can be achieved by pressing, with a finger of the operator, the rotary wheel 60 of the rotary wheel cylinder 57, or by inserting a proper member between a surface of the recess 51 of the central portion 48C and the rotary wheel 60. Further, the small gear 75 may be rotated using a proper tool such as tweezers, for example, so as to rotate the ring 73, or the teeth 74 of the ring 73 may be directly rotated with the tweezers. Furthermore, the operator may insert a finger from an upper side of the recess 51 of the central portion 48C to rotate the teeth 74 of the ring 73.

Note that, although the teeth 74 are formed along the whole periphery of the ring 73 in the embodiment, the teeth 74 may be formed on only a part of the periphery of the ring 73. This is because the position adjustment of the photographing optical system 68 with regard to the light-receiving surface of the CCD 71 is little, and further the lens barrel 58 cannot be rotated by full a turn so as to adjust the position of the photographing optical system 68.

As shown in FIGS. 1 through 4, a power supply circuit board 80, which is relatively heavy, is provided in a right end portion of the main casing section 10A. As shown in FIGS. 2, 4, and 8, a control circuit board 82 is provided between the bottom of the main casing section 10A and the optical system mount plate 20, and is fixed on the bottom. Electronic parts such as a CPU, a DSP, a memory, a capacitor, and so on are mounted on the control circuit board 82, and the circuit board 70 and the power supply circuit board 80 are connected to the control circuit board 82 through a flat flexible wiring cord (not shown).

In the embodiment, as shown in FIGS. 2, 4, and 8, an LCD monitor 84 is disposed on an upper surface of the top wall of the main casing section 10A. The LCD monitor 84 has a flat rectangular plate shape. The LCD monitor 84 is arranged in such a manner that its front and rear sides, positioned at opposite sides, are perpendicular to the optical axis of the photographing optical system 68, and the LCD monitor 84 is rotatable about a rotational shaft 86 provided along the front side. The LCD monitor 84 is usually folded or closed as shown by a solid line in FIG. 8. In this condition, since the display surface of the LCD monitor 84 faces an upper surface of the main casing section 10A, the display surface cannot be seen. Conversely, when a photographing operation is performed using the CCD 71, the LCD monitor 84 is rotated and raised from the folding position to a display position shown by a broken line in FIG. 8, so that the display surface of the LCD monitor 84 can be seen from the side of the ocular lens systems 15R and 15L.

The left end portion of the movable casing section 10B is divided by the partition 29, to form a battery chamber 88 in which batteries 92 are housed. As shown in FIGS. 2 and 4, a lid 90 is provided in a bottom wall of the battery chamber 88. By opening the lid 90, the batteries 92 can be mounted in or removed from the battery chamber 88. The lid 90 forms a part of the movable casing section 10B, and is fixed at a closing position shown in FIGS. 2 and 4 through a proper engaging mechanism.

The weight of the power supply circuit board 80 is relatively high, and similarly, the weights of the batteries 92 are relatively high. In the embodiment, two components having a relatively large weight are disposed in the both ends of the casing 10. Therefore, the weight balance of the binocular telescope with a photographing function is improved.

As shown in FIGS. 1 and 3, electrode plates 94 and 96 are provided at front and rear portions of the battery chamber 88. The batteries 92 are arranged parallel to each other in the battery chamber 88, and directed in the opposite directions in the battery chamber to contact the electrode plates 94 and 96. The electrode plate 94 is electrically connected to the casing 10, and the electrode plate 96 is electrically connected to the power supply circuit board 80 through a power source cable (not shown) so that electric power is supplied from the batteries 92 to the power supply circuit board 80. The power supply circuit board 80 supplies electric power to the CCD 71 mounted on the circuit board 70, the electric parts such as the microcomputer and the memory mounted on the control circuit board 82, and the LCD monitor 84.

As shown in FIG. 1 through FIG. 4, it is possible to provide a video output terminal 102, for example, as an external connector, on the power supply circuit board 80, and in this case, a hole 104 is formed in the front wall of the main casing section 10A so that an external connector is connected to the video output terminal 102. Further, as shown in FIGS. 2 and 3, a CF-card driver 106, in which a CF-card can be detachably mounted as a memory card, may be provided below the control circuit board 82 on the bottom of the main casing section 10A.

As shown in FIGS. 2, 4, and 8, a screw hole forming part 108 is integrally formed on the bottom part of the main casing section 10A. The screw hole forming part. 108 is a thick portion having a circular section, and a screw hole 110, opening to an outer surface of the bottom part, is formed in the thick portion. The screw hole 108 of the screw hole forming part 108 is connected to a screw attached to a tripod head.

Although, in the above embodiment, the optical unit of the present invention is the photographing optical unit 56, giving a photographing function to a binocular device, the present invention can be applied to other optical units which are assembled in the other optical devices. However, such an optical unit is limited to one that has a rotary wheel cylinder, a lens barrel that is disposed in the rotary wheel cylinder to linearly move along the central axis thereof, and a movement-conversion mechanism that converts a rotational movement of the rotary wheel cylinder into a linear movement or focusing movement of the lens barrel.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-134948 (filed on May 10, 2002) which is expressly incorporated herein, by reference, in its entirety.

What is claimed is:

1. An optical-position adjusting device for an optical unit, comprising:

a cylindrical member that is rotatable about the axis thereof;

a support member that rotatably supports said cylindrical member;

a lens barrel that is disposed in said cylindrical member and linearly movable along the central axis of said cylindrical member;

a movement-conversion mechanism that converts a rotational movement of said cylindrical member into a linear movement of said lens barrel;

a ring that is fit on said lens barrel in such a manner that said lens barrel can be moved along the central axis thereof, said ring being non-rotatable relative to said lens barrel; and a fixing member that is provided for fixing said ring to said support member in such a manner that said ring can be released from said support member.

2. A device according to claim 1, wherein said ring comprises teeth formed on at least a part of an outer periphery of said ring, and a key element that is slidably engaged with a key groove formed on an outer surface of said lens barrel and extended in the longitudinal direction thereof, said fixing member having a gear that is meshed with said teeth of said ring and is fixed on said support member through a screw, said ring being rotatable when said screw is loose, and being fixed relative to said support member when said screw is tight.

3. A device according to claim 1, wherein said lens barrel has an end portion projecting from said cylindrical member, and said ring is fit on said end portion.

4. A device according to claim 1, wherein said support member is formed with a relief groove extending along the central axis of said lens barrel, to avoid an interference between said fixing member and said support member.

5. A binocular telescope with a photographing function, comprising:

an inner frame;

a pair of telescopic optical systems that have a stationary part fixed on said inner frame, and a movable part movable relative to said stationary part, so that said telescopic optical systems focus on a subject;

a rotary wheel provided for focusing said pair of telescopic optical systems;

a focusing mechanism that converts a rotational movement of said rotary wheel into a movement of said movable part relative to said stationary part;

a cylindrical member that is rotatable about the axis thereof;

a support member that is a part of said inner frame to rotatably support said cylindrical member;

a lens barrel that is disposed in said cylindrical member and linearly movable along the central axis of said cylindrical member, and houses a photographing optical system;

a movement-conversion mechanism that converts a rotational movement of said cylindrical member into a linear movement of said lens barrel to focus said photographing optical system;

a ring that is fit on said lens barrel in such a manner that said lens barrel can be moved along the central axis thereof, said ring being non-rotatable relative to said lens barrel; and a fixing member that is provided for fixing said ring to said support member in such a manner that said ring can be released from said support member.

* * * * *